(12) United States Patent
Reddy et al.

(10) Patent No.: US 11,140,124 B2
(45) Date of Patent: *Oct. 5, 2021

(54) UTILIZING SERVICE TAGGING FOR ENCRYPTED FLOW CLASSIFICATION

(71) Applicant: Cisco Technology, Inc., San Jose, CA (US)

(72) Inventors: K. Tirumaleswar Reddy, Bangalore (IN); David McGrew, Poolesville, MD (US); Blake Harrell Anderson, San Jose, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,464

(22) Filed: Dec. 20, 2019

(65) Prior Publication Data

US 2020/0127966 A1  Apr. 23, 2020

Related U.S. Application Data

(63) Continuation of application No. 15/191,172, filed on Jun. 23, 2016, now Pat. No. 10,554,614.

(51) Int. Cl.
*H04L 29/12* (2006.01)
*H04L 29/08* (2006.01)
(Continued)

(52) U.S. Cl.
CPC ...... *H04L 61/1511* (2013.01); *H04L 61/1541* (2013.01); *H04L 63/0428* (2013.01);
(Continued)

(58) Field of Classification Search
CPC . H04L 61/1511; H04L 61/1541; H04L 67/322
See application file for complete search history.

(56) References Cited

U.S. PATENT DOCUMENTS 7,095,715 B2 ‡ 8/2006 Buckman ............... H04L 12/14
370/23
8,315,646 B2 ‡ 11/2012 Karjalainen .......... H04W 4/021
455/552.1
(Continued)

OTHER PUBLICATIONS

Wing et al. "PCP Flowdata Option draft-wing-pcp-flowdata-00" Intended status: Standards Track; Jul. 3, 2013; pp. 1-17.‡
(Continued)

*Primary Examiner* — Lynn D Feild
*Assistant Examiner* — Viral S Lakhia
(74) *Attorney, Agent, or Firm* — Behmke Innovation Group LLC; James M. Behmke; James J. Wong (57) ABSTRACT

In one embodiment, a device in a network receives domain name system (DNS) information for a domain. The DNS information includes one or more service tags indicative of one or more services offered by the domain. The device detects an encrypted traffic flow associated with the domain. The device identifies a service associated with the encrypted traffic flow based on the one or more service tags. The device prioritizes the encrypted traffic flow based on the identified service associated with the encrypted traffic flow.

20 Claims, 12 Drawing Sheets

(51) Int. Cl.
*H04L 29/06* (2006.01)
*H04L 12/851* (2013.01)

(52) U.S. Cl.
CPC ........ *H04L 67/322* (2013.01); *H04L 47/2433* (2013.01); *H04L 69/22* (2013.01)

(56) References Cited

U.S. PATENT DOCUMENTS

| | | | | |
|---|---|---|---|---|
| 8,539,221 | B2 * | 9/2013 | Tremblay | H04L 47/2441 713/150 |
| 8,559,335 | B2 ‡ | 10/2013 | Berman | H04L 45/02 370/254 |
| 8,843,997 | B1 * | 9/2014 | Hare | H04L 63/0815 726/3 |
| 9,154,479 | B1 ‡ | 10/2015 | Sethi | H04L 63/08 |
| 9,213,971 | B2 * | 12/2015 | Lee | G06Q 20/045 |
| 9,253,068 | B1 ‡ | 2/2016 | Wu | H04L 63/0245 |
| 9,608,809 | B1 * | 3/2017 | Ghetti | H04L 9/0819 |
| 9,686,127 | B2 ‡ | 6/2017 | Ramachandran | G06F 16/285 |
| 9,693,366 | B2 ‡ | 6/2017 | Adjakple | H04W 12/08 |
| 9,716,659 | B2 ‡ | 7/2017 | Dillon | H04L 47/22 |
| 9,807,016 | B1 ‡ | 10/2017 | Sarangapani | H04L 47/125 |
| 9,813,346 | B2 ‡ | 11/2017 | Pedersen | H04L 47/24 |
| 9,813,447 | B2 ‡ | 11/2017 | Rash | H04L 63/20 |
| 9,843,624 | B1 ‡ | 12/2017 | Taaghol | H04L 67/10 |
| 10,079,854 | B1 ‡ | 9/2018 | Scott | H04L 63/1466 |
| 10,505,970 | B2 * | 12/2019 | McGrew | H04L 61/1511 |
| 10,686,814 | B2 * | 6/2020 | Arnell | H04L 61/1511 |
| 10,805,318 | B2 * | 10/2020 | Manadhata | H04L 43/16 |
| 2008/0112410 | A1 ‡ | 5/2008 | Wood | H04L 45/00 370/392 |
| 2010/0103837 | A1 ‡ | 4/2010 | Jungck | H04L 29/12066 370/252 |
| 2013/0121298 | A1 ‡ | 5/2013 | Rune | H04L 29/12066 370/329 |
| 2013/0304796 | A1 ‡ | 11/2013 | Jackowski | H04L 47/19 709/202 |
| 2014/0201526 | A1 ‡ | 7/2014 | Burgess | G06F 21/316 713/165 |
| 2014/0259094 | A1 * | 9/2014 | Narayanaswamy | H04L 47/20 726/1 |
| 2014/0280822 | A1 ‡ | 9/2014 | Chennimalai Sankaran | H04L 41/5022 709/22 |
| 2015/0120909 | A1 ‡ | 4/2015 | Karthikeyan | H04L 61/1511 709/22 |
| 2015/0256508 | A1 ‡ | 9/2015 | Townsend | H04L 61/20 709/245 |
| 2016/0065597 | A1 ‡ | 3/2016 | Nguyen | H04L 63/1441 726/22 |
| 2016/0080502 | A1 ‡ | 3/2016 | Yadav | G06F 16/285 709/227 |
| 2016/0099961 | A1 * | 4/2016 | Paugh | G06F 16/90335 726/23 |
| 2016/0191466 | A1 ‡ | 6/2016 | Pernicha | H04L 63/20 726/1 |
| 2016/0315847 | A1 ‡ | 10/2016 | Zhang | H04L 12/6418 |
| 2016/0352628 | A1 ‡ | 12/2016 | Reddy | H04L 45/38 |
| 2017/0019691 | A1 ‡ | 1/2017 | Bouvet | H04N 21/2385 |
| 2017/0064749 | A1 ‡ | 3/2017 | Jain | G06F 16/9024 |
| 2017/0277525 | A1 * | 9/2017 | Czarnecki | G06F 8/62 |
| 2017/0330107 | A1 ‡ | 11/2017 | Gonzalez Sanchez | G06N 99/005 |
| 2018/0310350 | A1 ‡ | 10/2018 | Stojanovski | H04W 36/0033 |
| 2020/0160209 | A1 * | 5/2020 | Potkalesky | G06N 20/00 |

OTHER PUBLICATIONS

Moore et al. "Toward the Accurate Identication of Network Applications" University of Cambridge and Intel Research, Cambridge; pp. 1-14.‡ davidmcgrew; GitHub—flow data and intraflow data, for network research, forensics, and security monitoring; https://github.com/davidmcgrew/joy; pp. 1-4.‡

Dickinson et al. "Authentication and (D)TLS Profile for DNS-over-TLS and DNS-over-DTLS draft- ietf-dprive-dtls-and-tls-profiles-00" Intended status: Standards Track; Jan. 30, 2016; pp. 1-17.‡

Bittau et al. "TCP-ENO: Encryption Negotiation Option draft-ietf-tcpinc-tcpeno-01" Intended status: Experimental; Feb. 19, 2016; pp. 1-21.‡

Foremski et al. "DNS-Class: Immediate classi?cation of IP ?ows using DNS" International Journal of Network Management; Int. J. Network Mgmt 0000; pp. 1-28.‡

Foremski et al. "DNS-Class: Immediate classification of IP fows using DNS" International Journal of Network Management; Int. J. Network Mgmt (24:4), Jul. 2014; pp. 1-28.

GitHub—da667/ip2dns; https://github.com/da667/ip2dns; May 20, 2016; 1 page.

Moore, et al. "Toward the Accurate Identication of Network Applications" University of Cambridge and Intel Research, Cambridge; (2005) pp. 1-14.

\* cited by examiner
‡ imported from a related application

UTILIZING SERVICE TAGGING FOR ENCRYPTED FLOW CLASSIFICATION

RELATED APPLICATION

The present application is a continuation of U.S. patent Ser. No. 15/191,172, filed Jun. 23, 2016, entitled UTILIZING SERVICE TAGGING FOR ENCRYPTED FLOW CLASSIFICATION, by K. Tirumaleswar Reddy, et al., the contents of which are incorporated herein by reference.

TECHNICAL FIELD

The present disclosure relates generally to computer networks, and, more particularly, to utilizing service tagging for encrypted flow classification and prioritization.

BACKGROUND

The use of encryption by network traffic is increasing rapidly. Notably, transport layer security (TLS), opportunistic encryption, the availability of free public key infrastructure (PKI) certificates, and other factors, have led to a significant rise in encrypted Internet traffic. In addition, more and more protocols are using encryption for privacy purposes and to ensure security from attackers. For example, version 2 of the Hypertext Transfer Protocol (HTTP/2.0) strongly recommends the use of TLS, resulting in many websites now transitioning from using HTTP to using HTTP Secure (HTTPS).

Traditionally, some networks use traffic inspection techniques, to prioritize traffic flows in the network. For example, access networks often have insufficient bandwidth and constrained resources, thereby preventing some applications from functioning as well as desired. Although the quality of wireless and wired access networks continues to improve, resources in such networks remain constrained for various reasons. Thus, access networks and other networks with constrained resources often attempt to classify and prioritize their traffic flows using deep packet inspection (DPI) and/or Internet Protocol (IP) address lists. For example a device in an access network may use DPI to identify and prioritize one-way video streaming over file-transfer. However, DPI may not be available to the device, if the corresponding traffic flow is encrypted, thereby preventing the device from gleaning information about the flow for purposes of prioritizing the flow.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives domain name system (DNS) information for a domain. The DNS information includes one or more service tags indicative of one or more services offered by the domain. The device detects an encrypted traffic flow associated with the domain. The device identifies a service associated with the encrypted traffic flow based on the one or more service tags. The device prioritizes the encrypted traffic flow based on the identified service associated with the encrypted traffic flow.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
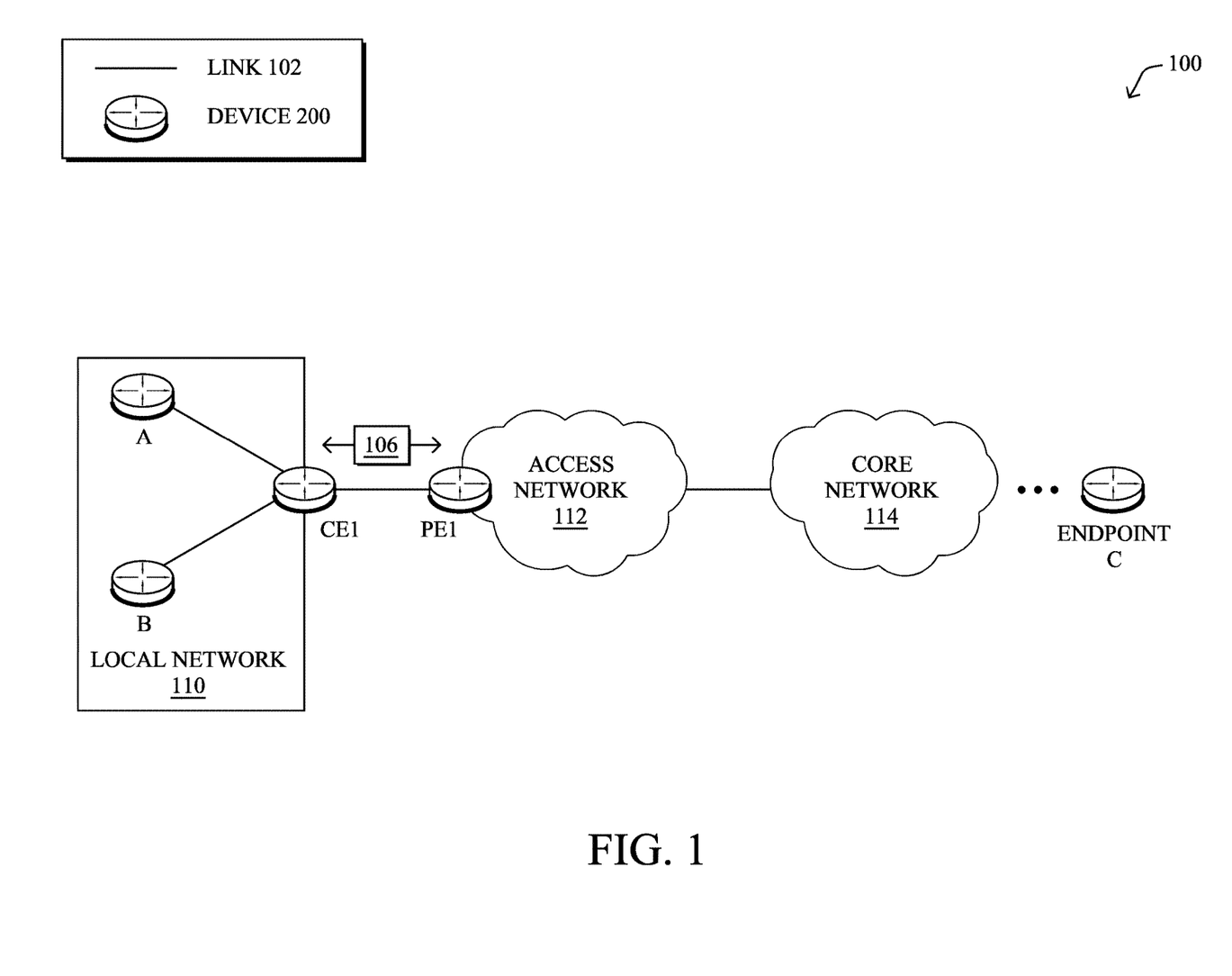
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
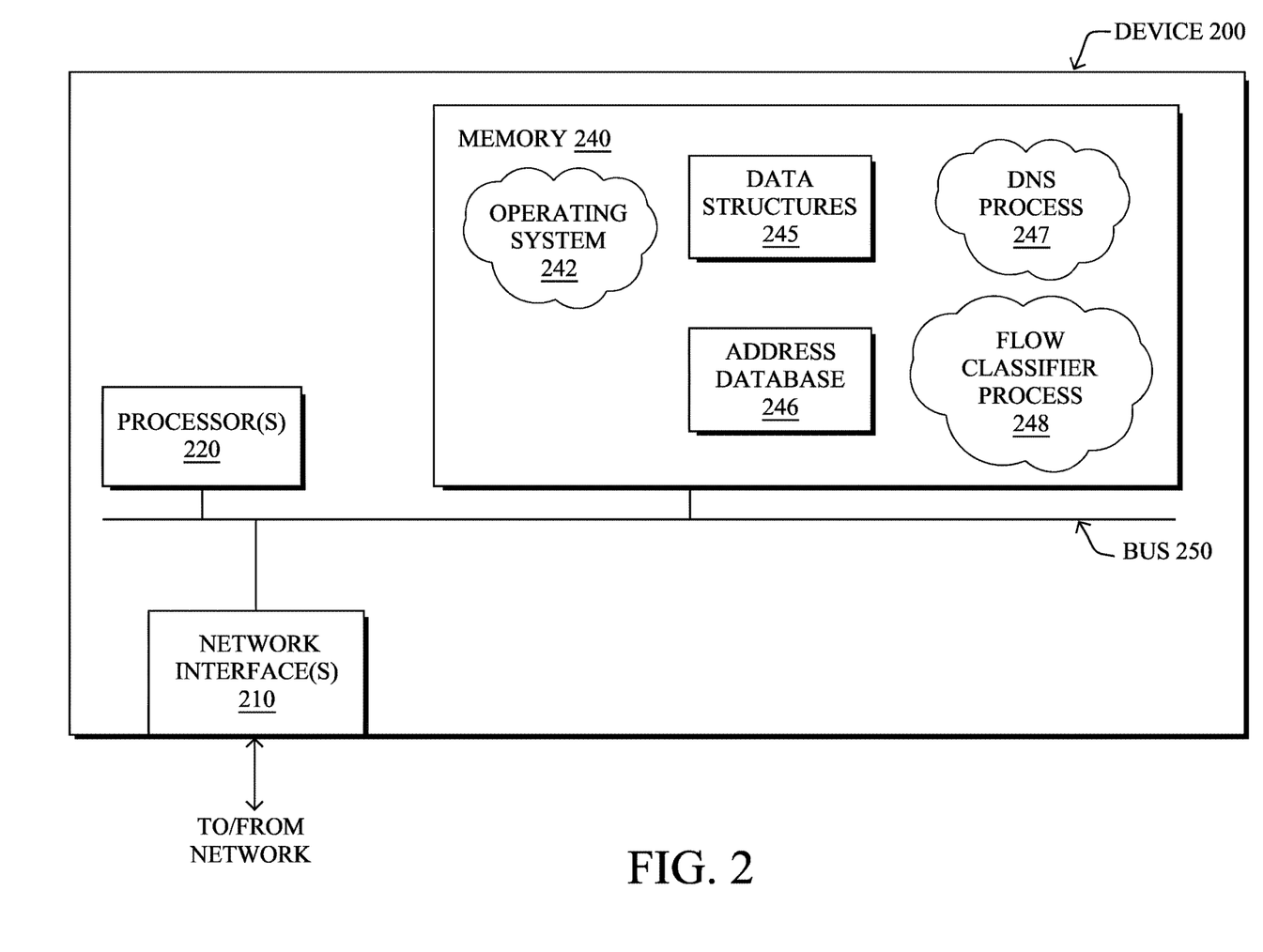
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a domain name system (DNS) process 247 and illustratively, a flow classifier process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Generally, DNS process 247 may be configured to process DNS request messages received from a client device and/or perform DNS lookups with a DNS server. In some embodiments, as shown, DNS process 247 may store any received DNS information from a lookup in a local address database 246. For example, DNS process 247 may perform a lookup of a particular domain name, to obtain the IP address associated with the domain. In turn, DNS process 247 may store the received DNS information in address database 246 for a period of time, allowing DNS process 247 to perform a local DNS lookup instead of having to send a DNS lookup request to a remote service.

In some embodiments, DNS process 247 may use an enhanced DNS service for DNS lookups. For example, OpenDNS™ offers enhanced DNS features such as phishing protection, in addition to traditional DNS services. In one embodiment, DNS process 247 may use the extension mechanisms for DNS (EDNS), to request additional information during a DNS lookup. Generally, EDNS allow for expanded DNS messaging that is not subject to the very limited size requirements of the original DNS protocol. The responding DNS service may also leverage EDNS in its DNS response to DNS process 247, to convey the additional information.

Flow classifier process 248 may include executable instructions that, when executed by processor(s) 220, cause device 200 to classify traffic flows and prioritize the traffic flows based on their classifications. Notably, certain network traffic may have different quality of service (QoS) requirements than other forms of traffic. For example, media streaming and conferencing applications (e.g., audio and/or video) may have very strict requirements in terms of jitter, latency, packet loss, etc., so as not to impinge on the user experience. Other application traffic, however, such as simple webpage traffic, may not be as susceptible to these factors, and may receive a lower network priority, accordingly.

In various embodiments, flow classifier process 248 may execute one or more machine learning-based classifiers to classify traffic flows. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, flow classifier process 248 can use the model M to classify new data points, such as information regarding new traffic flows in the network. Often, M is a statistical model, and the cost function is inversely proportional to the likelihood of M, given the input data.

Example machine learning techniques that flow classifier process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

As noted above, classifying and prioritizing traffic flows in modern networks remains challenging. In particular, the use of encrypted traffic may prevent the use of DPI to properly classify an encrypted flow. IP address lists may offer some insight into the encrypted traffic based on the IP address of the source or destination domain. However, IP address lists also require frequent updates and an IP address could be shared across multiple domains. For example, content for multiple domains may be served by a single content delivery network (CDN), multiple domains may be registered against a single proxy service, etc.

Utilizing Service Tagging for Encrypted Flow Classification

The techniques herein provide a mechanism that leverages external information to more accurately classify encrypted flows. In some aspects, the techniques herein propose using service tags as part of a DNS lookup, to identify the types of services associated with a particular domain and classify its associated traffic flows. In another aspect, the techniques herein may use machine learning to reduce the output space of a classifier (e.g., the number of classes), which leads to simpler, more robust models capable of classifying encrypted traffic flows.

Specifically, according to one or more embodiments of the disclosure as described in detail below, a device in a network receives domain name system (DNS) information for a domain. The DNS information includes one or more service tags indicative of one or more services offered by the domain. The device detects an encrypted traffic flow associated with the domain. The device identifies a service associated with the encrypted traffic flow based on the one or more service tags. The device prioritizes the encrypted traffic flow based on the identified service associated with the encrypted traffic flow.

Illustratively, the techniques described herein may be performed by hardware, software, and/or firmware, such as in accordance with DNS process 247 and traffic flow classifier process 248, which may include computer executable instructions executed by the processor 220 (or independent processor of interfaces 210) to perform functions relating to the techniques described herein.

Operationally, the techniques herein allow for a more accurate classification of encrypted traffic flows by leveraging service tagging, which the system can then use to prioritize the classified flows. FIGS. 3A-3E illustrate an example DNS lookup with service tagging, according to various embodiments. While the techniques herein are described primarily with respect to an access network, it is to be appreciated that this is for exemplary purposes only and that the techniques herein can be applied to any form of network in which traffic may be prioritized (e.g., a mobile network that suffers from congestion, etc.).

Figure 3A:
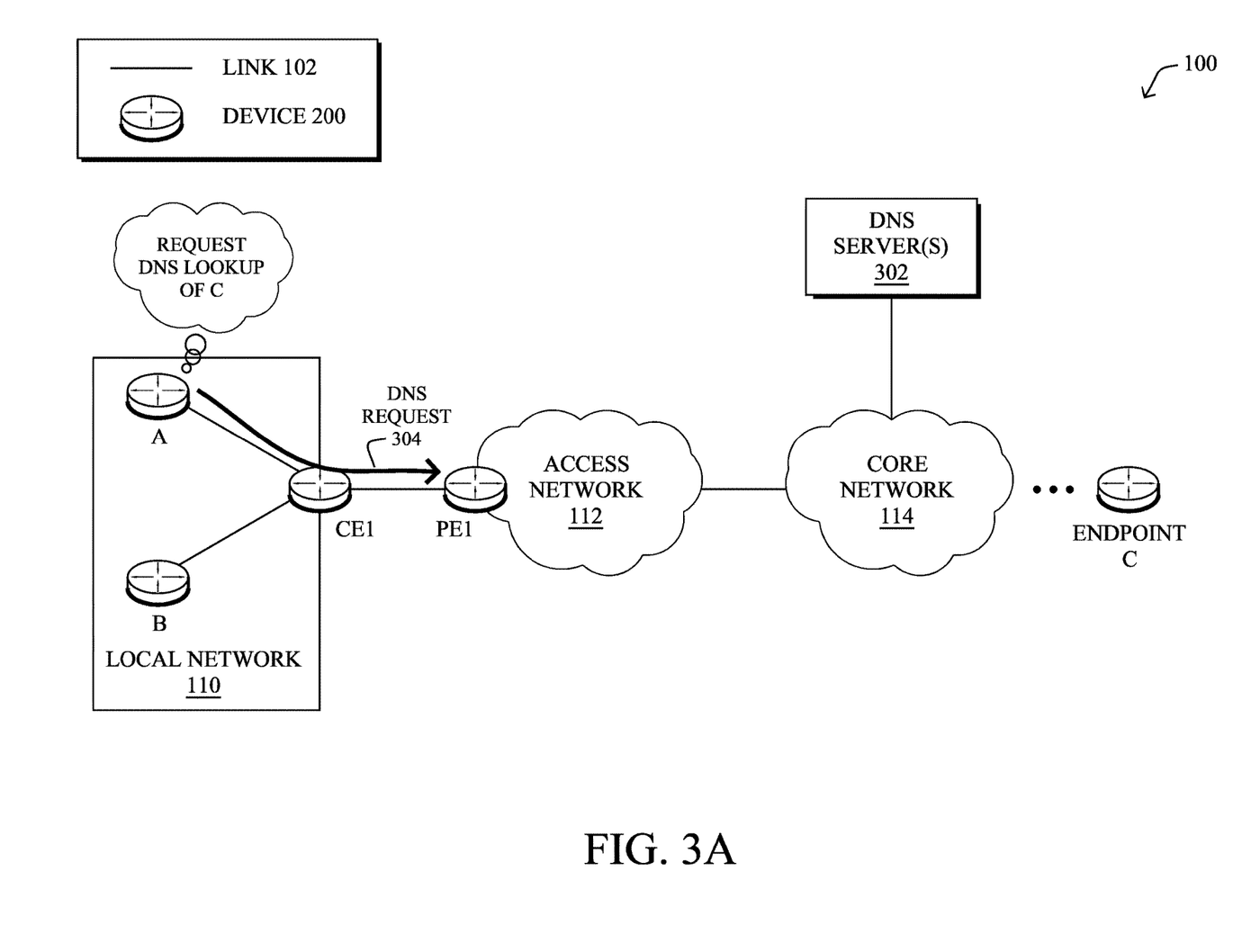
FIGS. 3A-3E illustrate an example domain name system (DNS) lookup with service tagging.

As shown in FIG. 3A, assume that node A is attempting to communicate with endpoint node C. In such a case, node A may send a DNS request 304, to request the IP address of the domain name associated with endpoint node C.

Figure 3B:
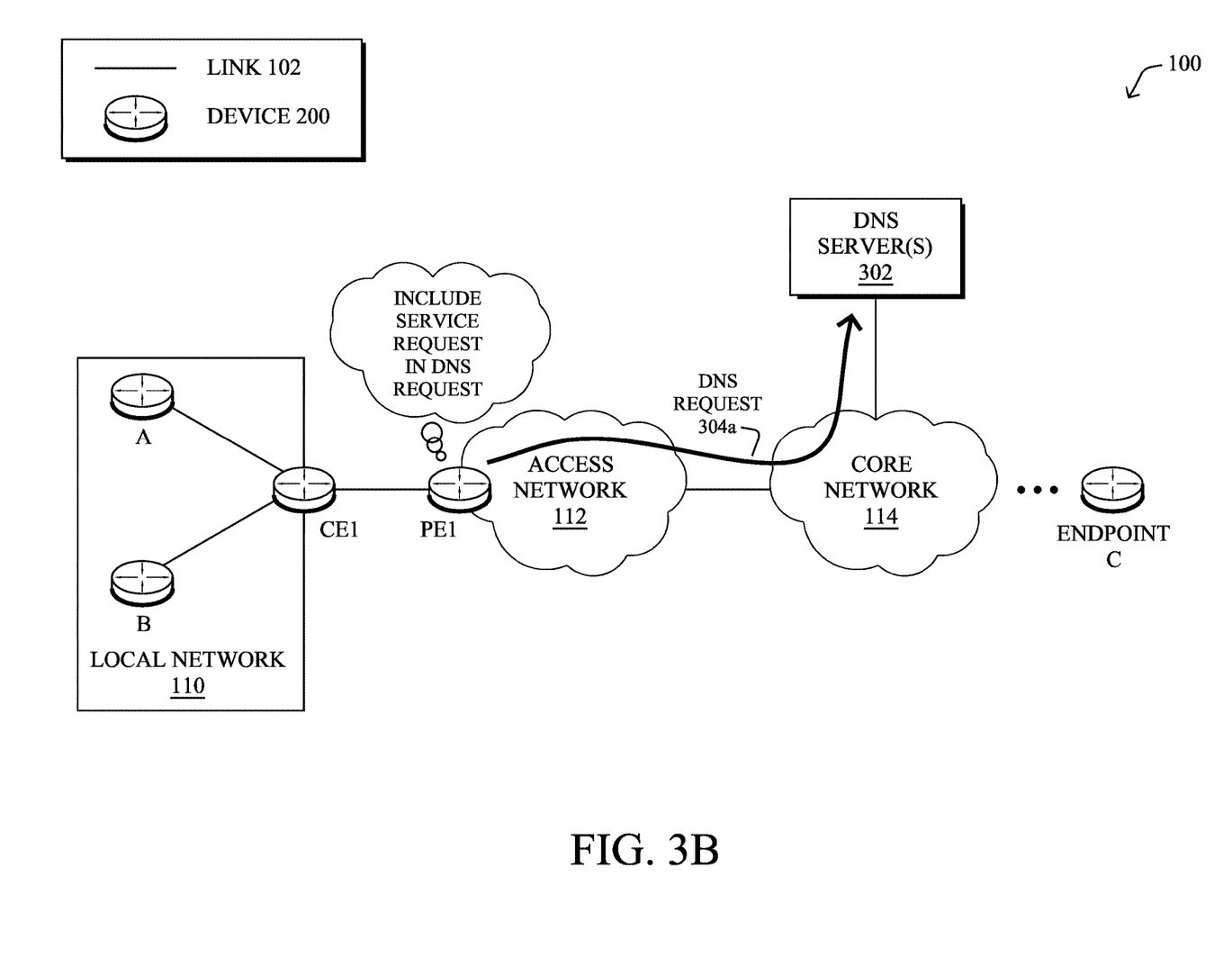

In FIG. 3B, PE1 or another networking device in access network 112 may send a DNS request 304a to DNS server(s) 302, to request DNS information regarding the domain of destination node C. In some embodiments, DNS request 304a may be sent in response to receiving DNS request 304 from client node A. For example, if the device does not already have DNS information for the domain name, it may perform a DNS lookup. In other embodiments, DNS request 304a may be sent as part of a pre-fetch DNS lookup of the domain.

In various embodiments, the DNS recursive server in access network 112 (e.g., PE1) that sends DNS request 304a may include a custom EDNS option in the DNS request, to request that DNS servers 302 include service information associated with the fully qualified domain name (FQDN) of endpoint node C. The networking device that sends DNS request 304a may also use DNS-over-(D)TLS, or another security mechanism, to secure the communication and to authenticate DNS server 302 (e.g., an OpenDNS™ server, etc.). Details regarding DNS-over(D)TLS can be found in the Internet Engineering Task Force (IETF) draft entitled "Authentication and (D)TLS Profile for DNS-over-TLS and DNS-over-DTLS," by Dickinson et al.

Figure 3C:
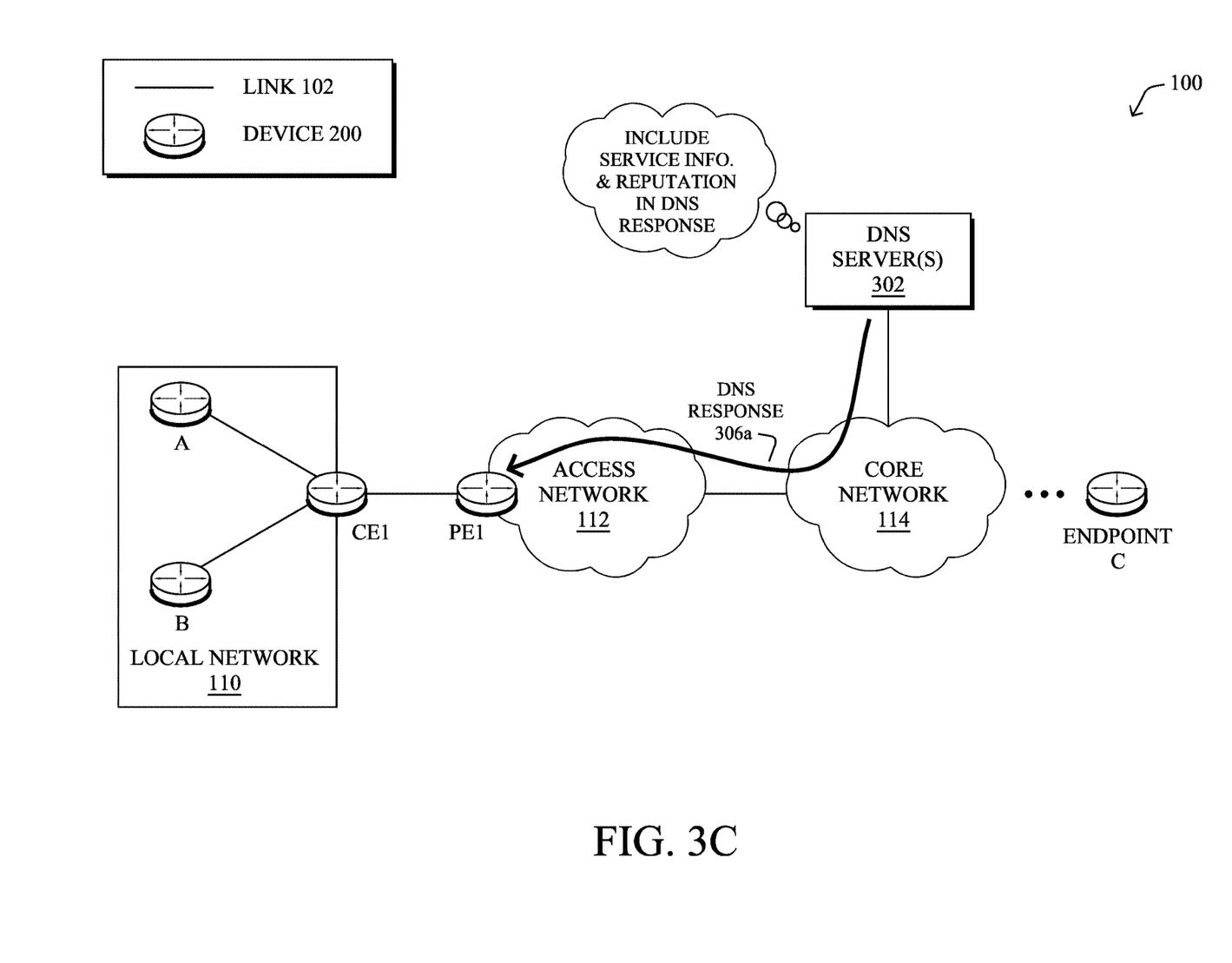

As shown in FIG. 3C, in response to receiving DNS request 304a with an EDNS-based service tag request, DNS server 302 may generate and send a DNS response 306a to the requesting network device in access network 112. In some embodiments, DNS response 306a may include DNS information such as the DNS lookup address and port of the FQDN, as well as one or more service tags included in a custom EDNS option. The one or more service tags may indicate the types of services offered by the domain. For example the service types conveyed in the EDNS option could indicate that the domain offers instant messaging, audio call, file exchange services, mail, conferencing, media streaming (e.g., audio and/or video), etc. The service information conveyed in the EDNS option should be structured and standardized so that it can be encoded in the EDNS option and processed by flow classifier process 248, accordingly. In further embodiments, DNS server 302 may also include a reputation score associated with the domain in DNS response 306a.

Figure 3D:
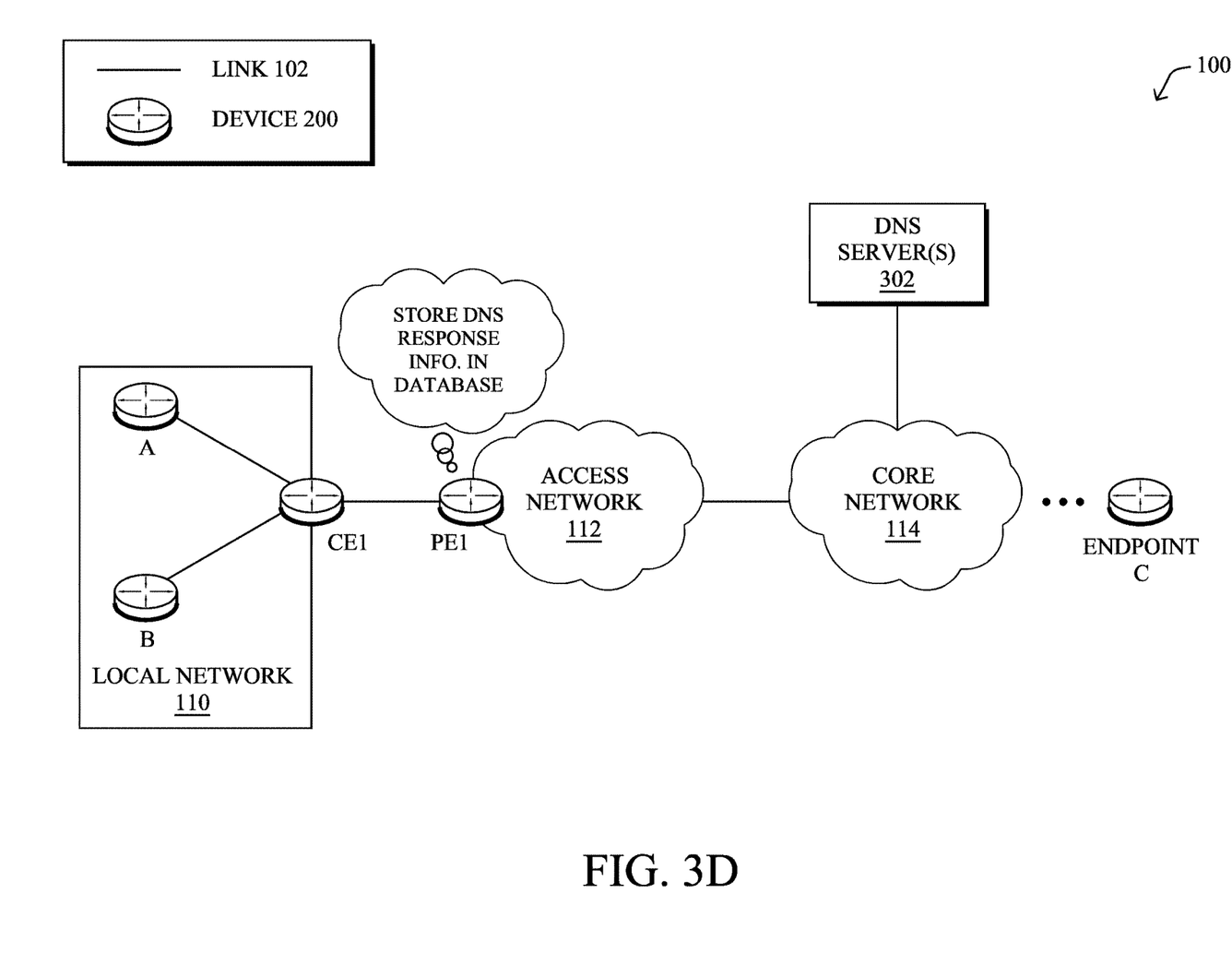

In FIG. 3D, the networking device in access network 112 may store the received DNS information included in DNS response 306a in a local address database (e.g., address database 246). Such a database may store the FQDN, the type of service(s) offered on IP addresses and ports (e.g., as indicated by the service tags), and/or the reputation of the domain. In some cases, the stored information may also be associated with an expiration time, allowing the stored DNS information to be aged out over time and prompting the storing device to perform a new DNS lookup as needed.

By storing the DNS information locally, this allows the device in access network 112 to process further DNS request from the nodes in local network 110 without having to perform repeated DNS lookups. In addition, if an IP address lookup in the local database fails, then the networking device in access network 112 can use a REST API or other mechanism to convey the IP address to DNS server 302, to learn the type of service(s) and list of domains associated with the IP address in the response, and update the database for future look-ups.

Figure 3E:
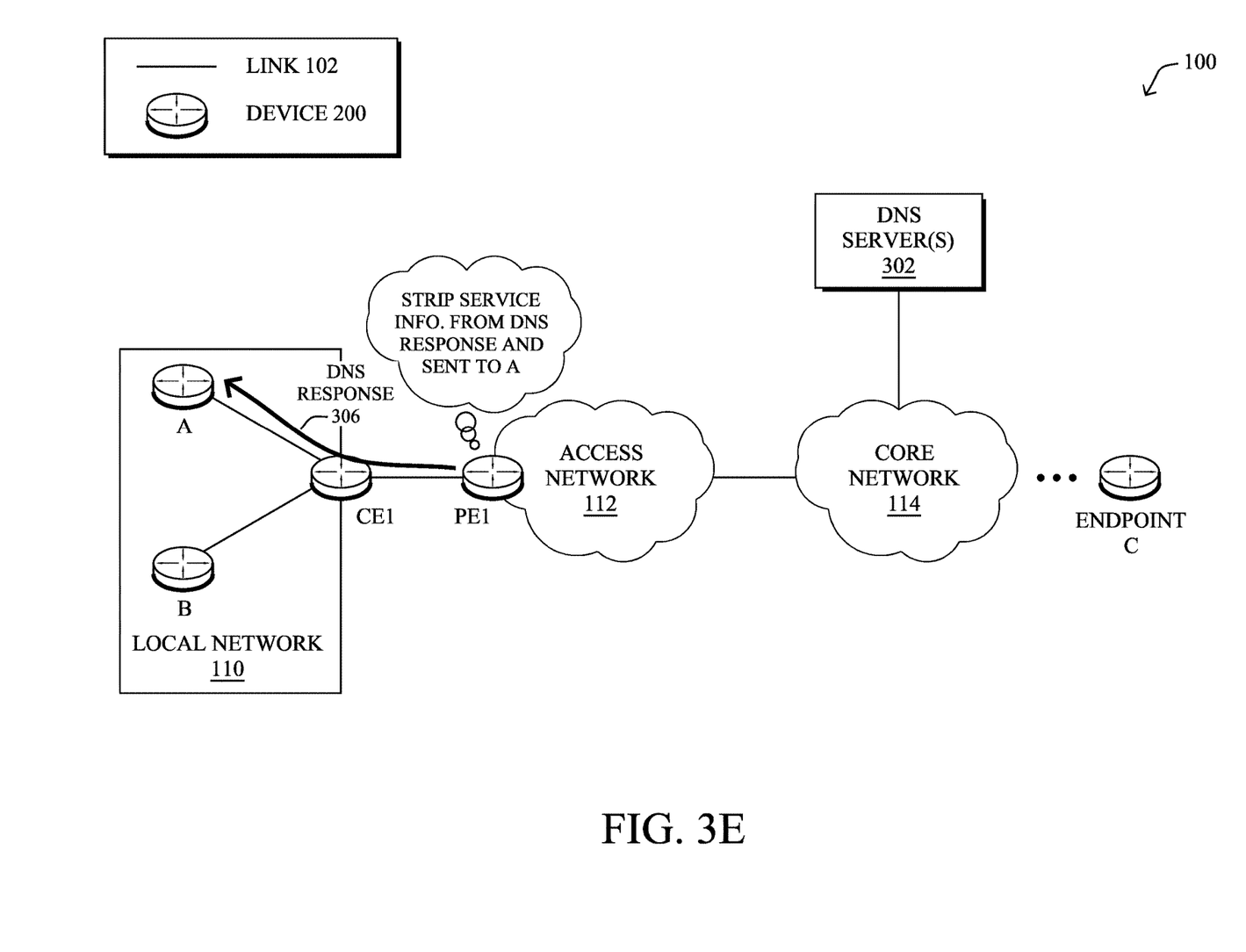

In FIG. 3E, the networking device in access network 112 may strip the new EDNS option from DNS response 306a and forward the response to client node A. In particular, the networking device may send a DNS response 306 to client device A that does not include the EDNS option information (e.g., service tags, reputation score, etc.) from DNS response 306a. In turn, client node/device A can then use the DNS information included in DNS response 306 to initiate one or more traffic flows between client node A and remote node C.

Figure 4A:
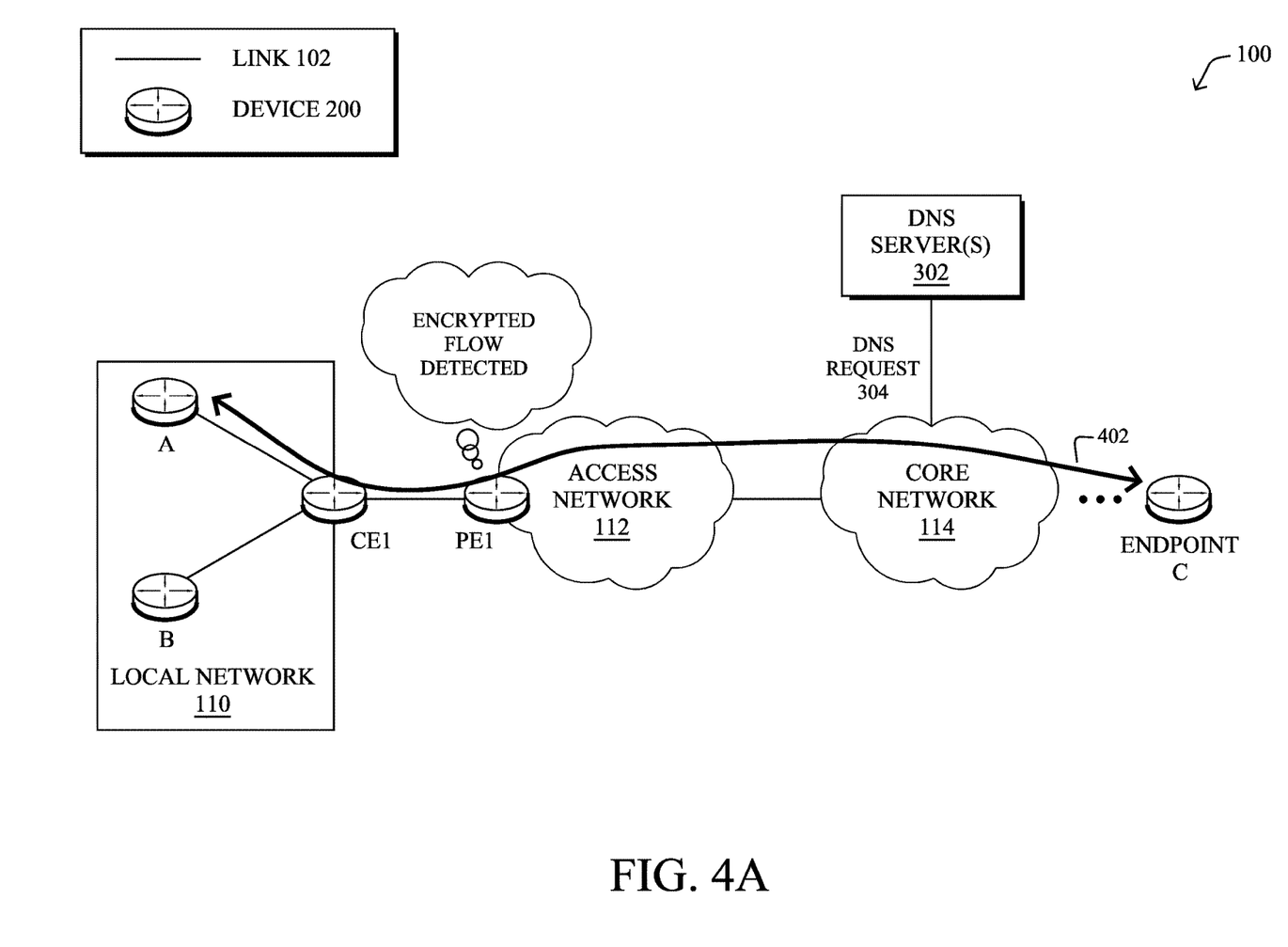
FIGS. 4A-4D illustrate an example of using DNS service tags to prioritize an encrypted traffic flow.

In various embodiments, the networking device in access network 112 may leverage the service tag information, reputation scores, or any other additional information included in DNS response 306a, to classify and prioritize traffic flows. FIGS. 4A-4D illustrate an example of using DNS service tags to prioritize an encrypted traffic flow, in some embodiments. As shown in FIG. 4A, assume that node A initiates one or more encrypted traffic flows 402 with endpoint node C, after obtaining the DNS information for endpoint node C via DNS response 306.

If the networking device in access network 112 detects an unencrypted traffic flow, it may classify and prioritize the flow by inspecting the packets of the flow (e.g., by performing DPI). However, if traffic flow 402 is encrypted, the networking device may detect the encryption and perform additional flow analysis using the service tag(s) associated with the domain of endpoint node C. For example, the networking device may perform a lookup in its local database, to determine the service(s) associated with domain of endpoint node C. The flow classification may proceed as described below.

Figure 4B:
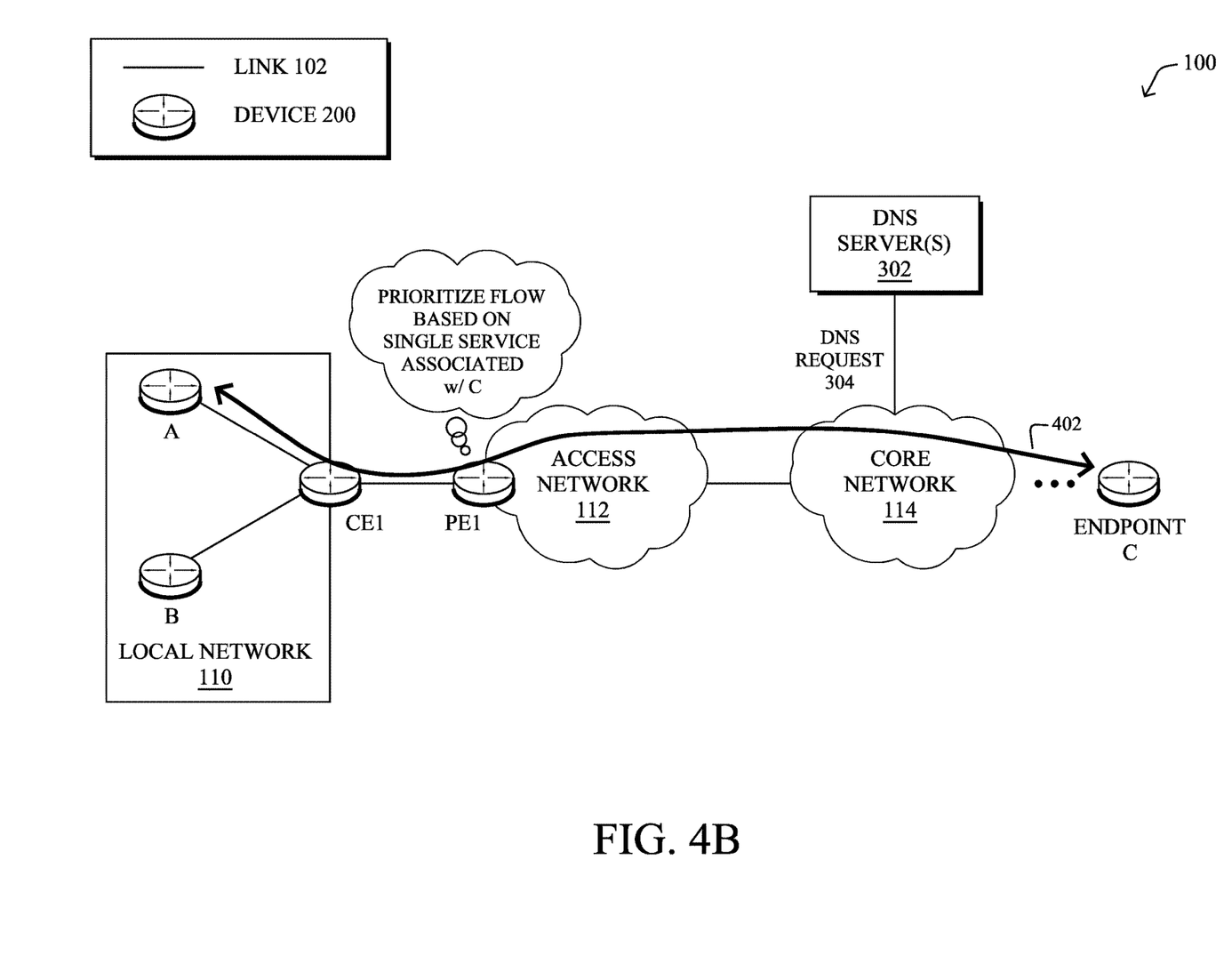

As shown in FIG. 4B, assume that the domain of node C has only a single associated service. In such a case, the networking device may classify the encrypted traffic flow 402 as being associated with this service. In turn, the networking device may prioritize traffic flow 402 based on the associated service. For example, if the service tag for the domain indicates that the domain offers only videoconferencing services, the networking device may give traffic flow(s) 402 a higher priority.

Figure 4C:
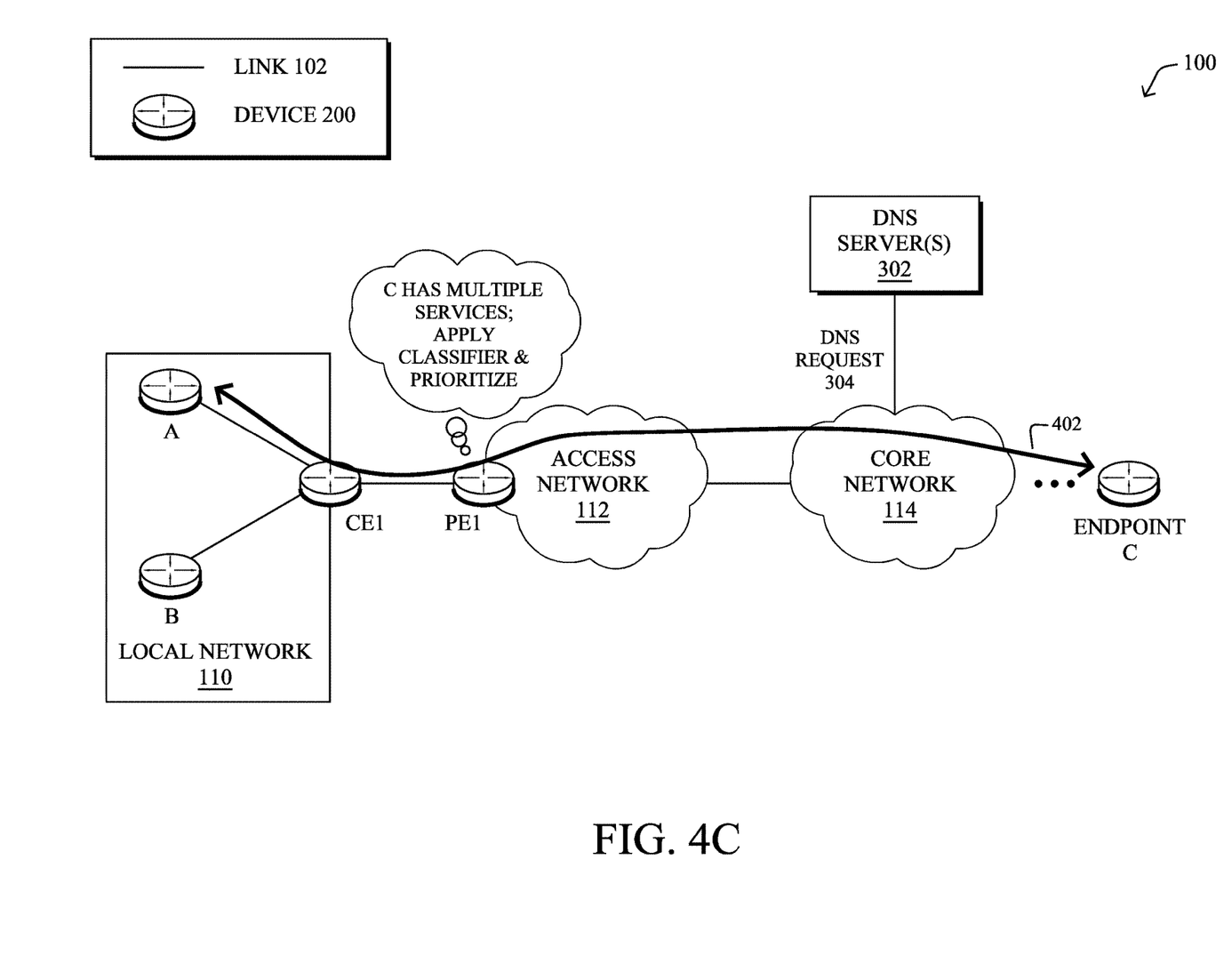

In a more complex situation, the domain may have multiple associated services. In such cases, as illustrated in FIG. 4C, the networking device may use one or more machine learning classifiers, to identify the service actually associated with traffic flow 402. For example, if the networking device observes an encrypted flow to mail.yahoo.com, the service tags for this domain may indicate that the domain offers both webmail and search engine services. Thus, the device may need to further assess whether the encrypted traffic flow 402 is using the webmail service or the search engine service.

In particular, if there is more than one service associated with the domain, the device may use a classifier that has been trained to distinguish between those services, to monitor the flow. This greatly simplifies the classification problem, since the classifier only needs to consider a smaller set of services instead of the whole universe of possible service types. For example, if the set of possible services is reduced to either webmail or search engine services, other service types can be ignored. In some embodiments, the device may maintain any number of machine learning classifiers, to distinguish among the reduced sets of possible services of the traffic flows.

The networking device may train a given traffic flow classifier by analyzing any number of characteristics of traffic flows associated with the possible services. For example, the classifier may take into account any or all of the following information, among other flow information:

Sequence of packet lengths and arrival times (SPLT) information;
Byte distribution information (e.g., relative frequency for each byte in a flow, entropy of the flow computed over the full byte distribution, mean and standard deviation of the bytes, etc.);
TLS data types (e.g., a list of offered cipher suites, the selected cipher suite, the length of the clientKeyExchange field, etc.);
Flow statistics or counts (e.g., the number of inbound bytes, the number of outbound bytes, the number of outbound packets, the source port and destination port).

By assessing the characteristics of the traffic flows associated with the different types of services, the classifier is able to identify the particular service associated with the encrypted flow from among the services signaled in the EDNS option in the DNS response. If the IP address is shared by multiple domains then the database lookup will return all the services offered by those domains and the flow classifier determines the service among the services offered by those domains. In turn, the networking device may determine a priority for the encrypted traffic flow based on the identified service associated with the flow.

In general, it can be assumed that there is a well-defined set of labeled data and that there are n-number of labels, where a label describes the type of service offered by a domain (e.g., "webmail" or "video conference"). In some embodiments, the device can use this corpus of labeled data to train a single binary classifier for each type of service. Each binary classifier can employ a one vs. the rest strategy in which positive examples will be the selected service and negative examples will be the set of all other services. For example, a given binary classifier may answer the question, "is the traffic flow related to the "webmail" service or not?" As noted, the device can use any number of different classifier techniques such as logistic regression, SVMs, etc.

In one example, assume that the device has trained a set of binary classifiers for each type of service. If the device then detects a new encrypted traffic flow associated with a particular domain, the device may identify the services associated with the domain. In turn, the device may select the binary classifiers that correspond to these services and apply these classifiers to the encrypted traffic flow. Doing so greatly reduces the number of classifiers that need to be applied to the traffic flow by limiting the classifiers to only the services associated with the domain. Next, the device may assess the classification results to determine which classification label is most applicable to the traffic. For example, the device may choose the label reported by the classifier with the highest classification score, to identify the service that is most likely associated with the encrypted traffic.

Figure 4D:
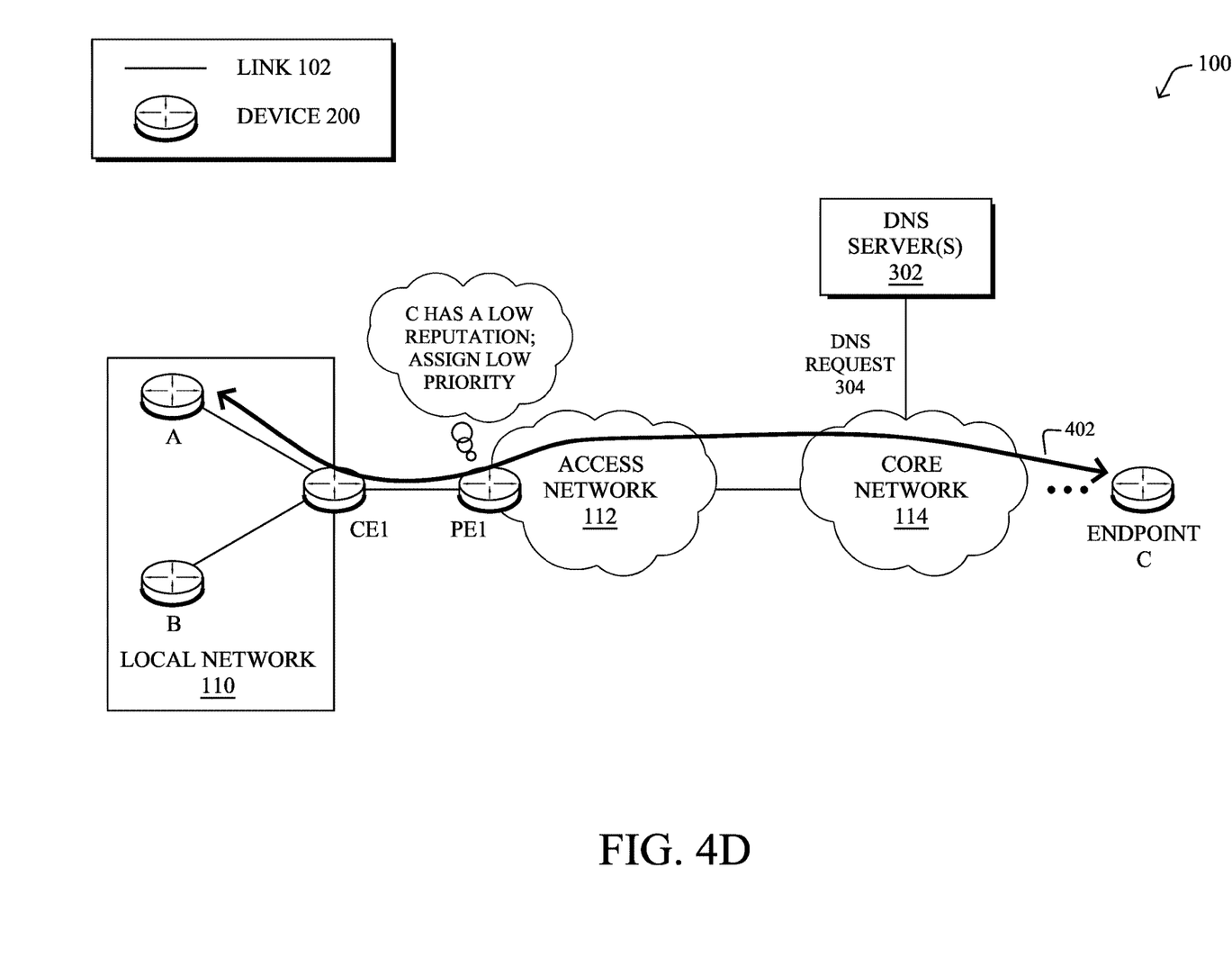

As shown in FIG. 4D, another factor included in a DNS response that may influence the priority of an encrypted traffic flow is the reputation of the corresponding domain. Notably, if the reputation of the IP address associated with a domain is low, then the flow classifier may skip classifying the flow and mark the flow as low priority, thereby penalizing the flow when link congestion is present. In other cases, the device may base the flow priority on a combination of the reputation score and the associated service. In further embodiments, the device may obtain reputation information and/or service information regarding a domain using other mechanisms, such as Beaker.

Access networks today are also building new protocols with content providers to zero-rate certain traffic, such as zero-rating traffic to Facebook™. In further embodiments, these custom protocols can be extended to describe the types of services offered by the content provider and their associated QoS requirements. Access networks can classify the zero-rated flows using the flow classifier described above that is trained to distinguish between the services offered by the content provider and enforce the QOS policy. In addition, an access network can use the classification techniques herein to validate the traffic is what the content provider claims using a "trust but verify" approach.

Figure 5:
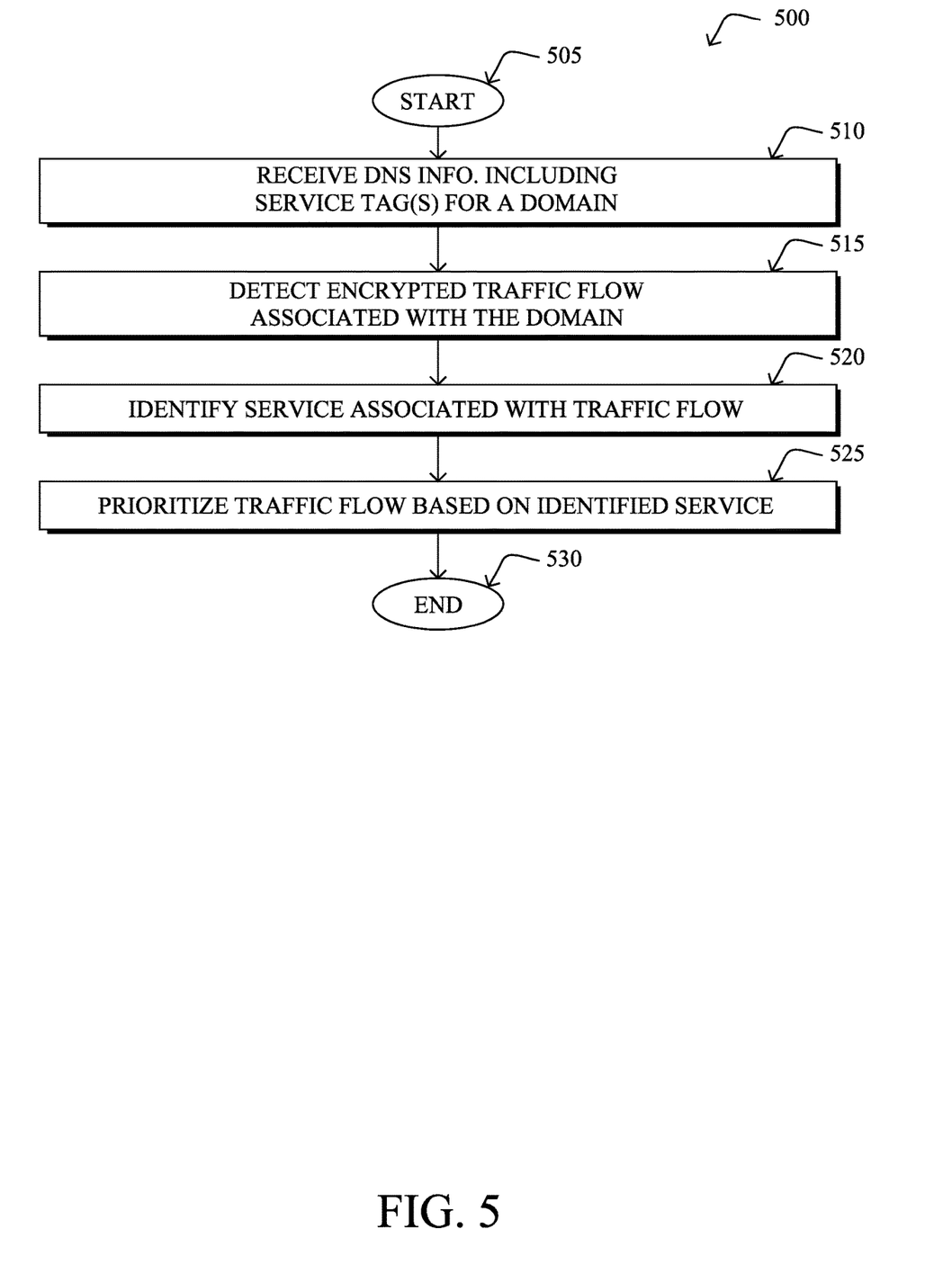
FIG. 5 illustrates an example simplified procedure for utilizing service tagging for encrypted flow classification.

FIG. 5 illustrates an example simplified procedure for utilizing service tagging for encrypted flow classification, in accordance with one or more embodiments described herein. For example, a non-generic, specifically configured device (e.g., device 200) may perform procedure 500 by executing stored instructions (e.g., processes 247-248). The procedure 500 may start at step 505, and continues to step 510, where, as described in greater detail above, the device may receive DNS information. Such information may include the IP address and port information associated with a given domain name. In various embodiments, the received DNS information may also include one or more service tags that indicate the types of services offered by the domain. For example, the device may receive a DNS response that includes one or more service tags in an EDNS option. In another embodiment, the DNS information may also include a reputation score for the domain name (e.g., based on reported malware, spyware, phishing attempts, etc.).

At step 515, as detailed above, the device may detect an encrypted traffic flow associated with the domain. For example, the device may determine that a given traffic flow is being sent to the domain or is being sent by the domain, based on the header information of packets in the flow. In addition, the device may analyze the TLS information of the packets, to determine that the flow is encrypted, thereby requiring additional classification.

At step 520, the device may identify a service associated with the encrypted traffic flow based on the one or more service tags for the domain, as described in greater detail above. In one embodiment, if the domain associated with the encrypted traffic flow has a single service tag, the device may identify the traffic flow as relating to the corresponding service. In further embodiments, and particularly when multiple service tags are associated with the domain, the device may use a machine learning classifier, to determine which of the services is being employed by the traffic flow. For example, the device may train such a classifier by assessing traffic characteristics of traffic flows for the various services (e.g., in terms of SPLT information, byte distribution information, flow statistics or counts, combinations thereof, or any other traffic characteristics available to the device. In another embodiment, the device may employ an additional classification for unknown services, if the characteristics of the encrypted traffic flow do not fit with any of the services associated with the domain. Such a case may arise, for example, if the domain begins offering a new type of service.

At step 525, as detailed above, the device may prioritize the encrypted traffic flow based on the identified service associated with the traffic flow. In particular, the device may maintain a mapping of traffic priorities for the different service types, based on the QoS requirements of each type of traffic flow. For example, the device may assign a high priority to traffic for a real-time media streaming service, since delays, jitter, packet loss, etc., can impact the user experience. Conversely, the device may assign a lower priority to traffic associated with an online email service, as a slight delay is unlikely to impact the user experience. In further embodiments, the device may base the priority in part on the reputation score of the domain. For example, if the domain has a low reputation score, the device may nonetheless assign a low priority to the encrypted traffic, regardless of the associated service. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a mechanism that allows the network to glean information about an encrypted traffic flow for purposes of prioritizing the flow. The mechanism does so in a way that preserves the users' privacy, in contrast to other approaches that intercept and decrypt traffic to perform traffic inspections. In some aspects, the mechanism may employ one or more machine learning classifiers, to improve flow classifications. This is particularly helpful in cases where there are different services hosted on the same IP address of a server. Further, the disclosed techniques are fairly easy to deploy.

While there have been shown and described illustrative embodiments that provide for the classification and prioritization of encrypted traffic flows, it is to be understood that various other adaptations and modifications may be made within the spirit and scope of the embodiments herein. For example, while certain embodiments are described herein with respect to using certain network configurations and topologies, the techniques can be adapted for use in any form of network that requires traffic flow prioritization of encrypted flows, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, domain name system (DNS) information for a domain, wherein the DNS information includes one or more service tags indicative of one or more services offered by the domain;
   populating, by the device, a local database of DNS information from the received DNS information;
   training, by the device, a machine learning-based traffic flow classifier to distinguish one or more domain services associated with the domain;
   detecting, by the device, an encrypted traffic flow associated with the domain;
   identifying, by the device, a service of the one or more domain services as associated with the encrypted traffic flow based on information in the local database and by applying the machine learning-based traffic flow classifier to the encrypted traffic flow; and
   prioritizing, by the device, the encrypted traffic flow based on the identified service of the one or more services associated with the encrypted traffic flow.

2. The method as in claim 1, further comprising:
   sending, by the device, a DNS request for the DNS information, wherein the DNS request includes a request for the one or more service tags indicative of the one or more services offered by the domain.

3. The method as in claim 2, wherein the request for the one or more service tags is included in an extension mechanism for DNS (EDNS) field of the DNS request.

4. The method as in claim 1, wherein the DNS information is received via a DNS response that includes the one or more service tags in an extension mechanism for DNS (EDNS) field.

5. The method as in claim 1, wherein the received DNS information further comprises a reputation score associated with the domain, and wherein the encrypted traffic flow is prioritized based further in part on the reputation score associated with the domain.

6. The method as in claim 1, wherein the device is located in an access network.

7. The method of claim 1, wherein the service associated with the encrypted traffic flow is identified while the encrypted traffic flow is still encrypted.

8. An apparatus, comprising:
one or more network interfaces to communicate with a network;
a processor coupled to the network interfaces and configured to execute one or more processes; and
a memory configured to store a process executable by the processor, the process when executed operable to:
receive domain name system (DNS) information for a domain, wherein the DNS information includes one or more service tags indicative of one or more services offered by the domain;
populate a local database of DNS information from the received DNS information;
train a machine learning-based traffic flow classifier to distinguish one or more domain services associated with the domain;
detect an encrypted traffic flow associated with the domain;
identify a service of the one or more domain services as associated with the encrypted traffic flow based on information in the local database and by applying the machine learning-based traffic flow classifier to the encrypted traffic flow; and
prioritize the encrypted traffic flow based on the identified service of the one or more services associated with the encrypted traffic flow.

9. The apparatus as in claim 8, wherein the process when executed is further operable to:
send a DNS request for the DNS information, wherein the DNS request includes a request for the one or more service tags indicative of the one or more services offered by the domain.

10. The apparatus as in claim 9, wherein the request for the one or more service tags is included in an extension mechanism for DNS (EDNS) field of the DNS request.

11. The apparatus as in claim 10, wherein the DNS information is received via a DNS response that includes the one or more service tags in an extension mechanism for DNS (EDNS) field.

12. The apparatus as in claim 8, wherein the received DNS information further comprises a reputation score associated with the domain, and wherein the encrypted traffic flow is prioritized based further in part on the reputation score associated with the domain.

13. The apparatus as in claim 8, wherein the apparatus is located in an access network.

14. The apparatus of claim 8, wherein the service associated with the encrypted traffic flow is identified while the encrypted traffic flow is still encrypted.

15. A tangible, non-transitory, computer-readable medium storing program instructions that cause a device in a network to execute a process comprising:
receiving, at a device in a network, domain name system (DNS) information for a domain, wherein the DNS information includes one or more service tags indicative of one or more services offered by the domain;
populating, by the device, a local database of DNS information from the received DNS information;
training, by the device, a machine learning-based traffic flow classifier to distinguish one or more domain services associated with the domain;
detecting, by the device, an encrypted traffic flow associated with the domain;
identifying, by the device, a service of the one or more domain services as associated with the encrypted traffic flow based on information in the local database and by applying the machine learning-based traffic flow classifier to the encrypted traffic flow; and
prioritizing, by the device, the encrypted traffic flow based on the identified service of the one or more services associated with the encrypted traffic flow.

16. The tangible, non-transitory, computer-readable medium as in claim 15, wherein the process further comprises:
altering, by the device, the received DNS information by stripping the one or more service tags; and
forwarding, by the device, the altered DNS information to a client device, in response to a DNS request from the client device.

17. The tangible, non-transitory, computer-readable medium as in claim 16, wherein the request for the one or more service tags is included in an extension mechanism for DNS (EDNS) field of the DNS request.

18. The tangible, non-transitory, computer-readable medium as in claim 15, wherein the DNS information is received via a DNS response that includes the one or more service tags in an extension mechanism for DNS (EDNS) field.

19. The tangible, non-transitory, computer-readable medium as in claim 15, wherein the received DNS information further comprises a reputation score associated with the domain, and wherein the encrypted traffic flow is prioritized based further in part on the reputation score associated with the domain.

20. The tangible, non-transitory, computer-readable medium as in claim 15, wherein the service associated with the encrypted traffic flow is identified while the encrypted traffic flow is still encrypted.

* * * * *